United States Patent [19]

Mantovani

[11] Patent Number: 4,796,353
[45] Date of Patent: Jan. 10, 1989

[54] PROCESS FOR PRODUCING AN ELECTRIC ARBOR INTEGRATED WITH AN INDUCTION MOTOR

[75] Inventor: Elis Mantovani, Cadempino, Switzerland

[73] Assignee: Tecnodelta S.A., Manno, Switzerland

[21] Appl. No.: 79,029

[22] Filed: Jul. 29, 1987

[30] Foreign Application Priority Data

Nov. 24, 1986 [CH] Switzerland ............. 4690/86

[51] Int. Cl.$^4$ ............................. H02K 15/02
[52] U.S. Cl. ........................... 29/596; 310/42; 310/211
[58] Field of Search ............ 29/598, 596; 310/211, 310/212, 42

[56] References Cited

U.S. PATENT DOCUMENTS 3,902,087 8/1975 Hakamada et al. .............. 310/211

Primary Examiner—Carl E. Hall
Attorney, Agent, or Firm—Young & Thompson

[57] ABSTRACT

An electric arbor integrated (FIG. 1) with an induction motor (2), for frequencies up to and beyond 3000 Hz, is made up of a sleeve (3), having two coaxial tubular parts (3' and 3") finished at the same time, assuring the identical distance (3''') achieving extreme precision of the arbor (1). The arbor shaft (23), supported by bearings (6, 6' and 6") is inserted into the sleeve (3). To the back end of the sleeve (3) is fastened the motor (2), whose stator core stack (4) is made with thin laminations (FIG. 6) and into said stator (4) is introduced insulating resin charged with substances improving the thermal conductivity. The rotor (5), mounted cantilevered on the arbor shaft (23), is made of thin conductive laminations, fastened by the damping resin, which, melted on the ends, forms the short-circuit rings contained by the rings.

1 Claim, 5 Drawing Sheets

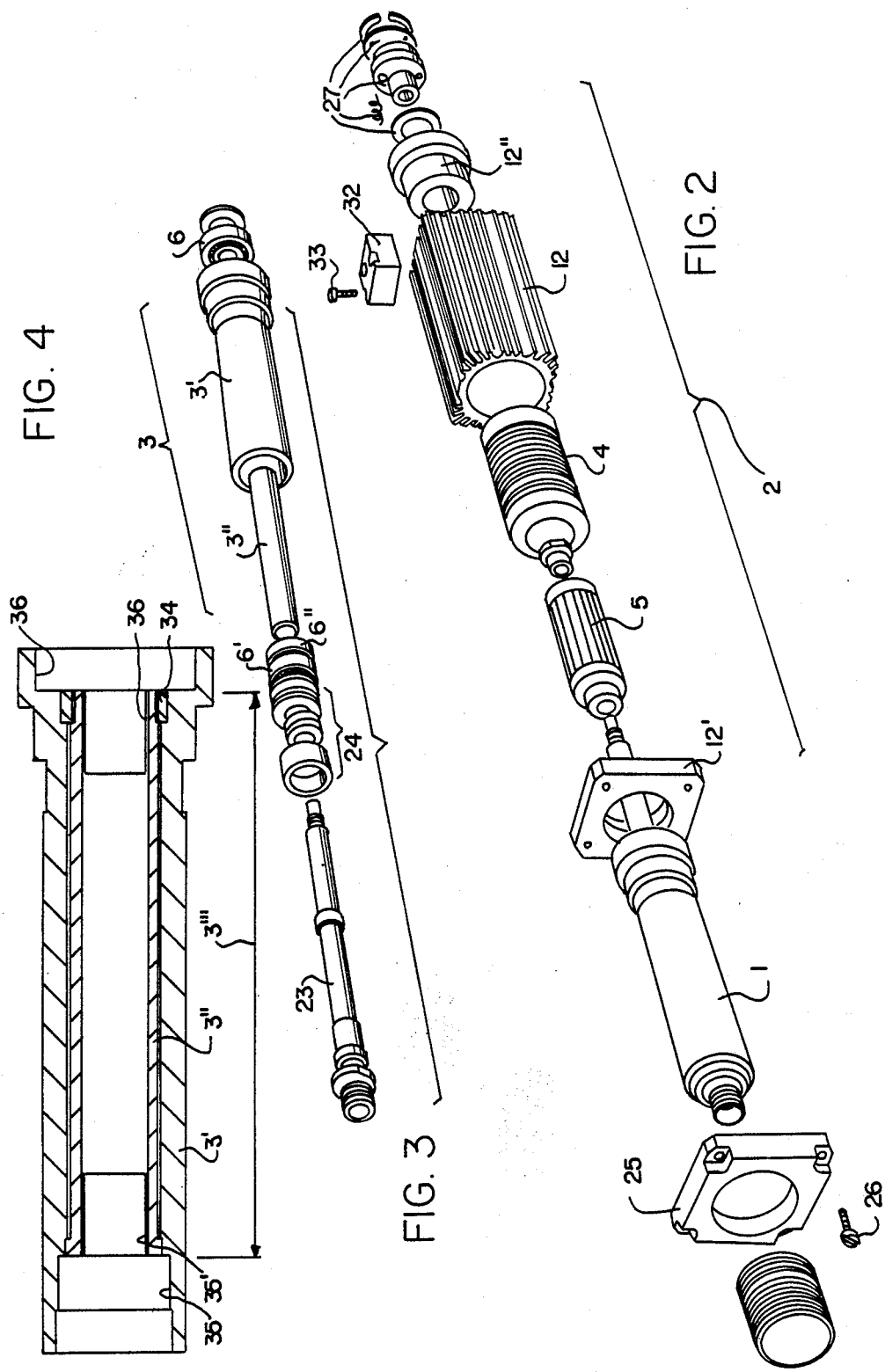

PROCESS FOR PRODUCING AN ELECTRIC ARBOR INTEGRATED WITH AN INDUCTION MOTOR

This invention has as its object an electric arbor integrated with an induction motor for frequencies up to and beyond 3000 Hz, suitable for mechanical work, making possible high performance (precision, speed, power and life) extreme compactness (very limited weight and size), notable modularity (versatility in use) and low cost, characterized in that the extreme precision is concentrated in the sleeve of the arbor, while the compactness is governed by the stator and rotor.

By innovative mechanical and electromechanical technologies it is possible, according to the invention, to achieve a family of low-cost arbors, making possible a very wide range of high-precision mechanical workings.

The accompanying drawings represent a preferred embodiment of the electric arbor in question.

FIG. 2 represents the unit disassembled into individual elements partially grouped.

FIG. 3 represents the arbor disassembled into individual elements.

FIG. 4 represents the sleeve in axial section.

Figure 1:
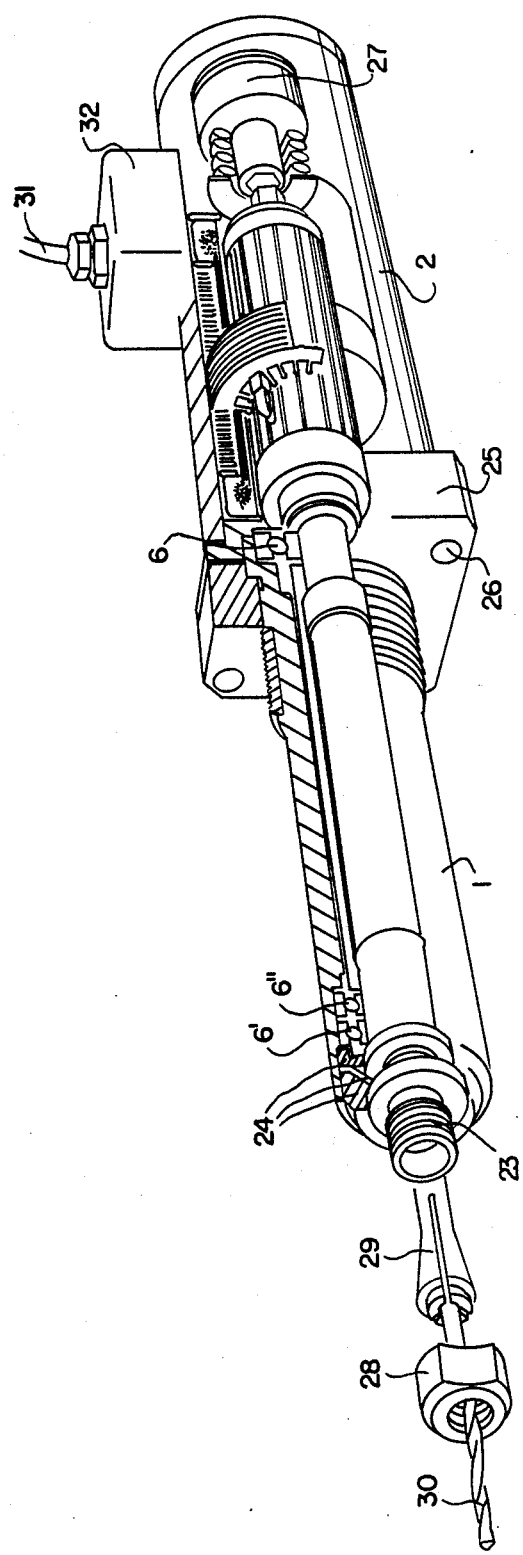
FIG. 1 represents the entire unit partly sectioned along its longitudinal axis.

In short, said electric arbor, FIG. 1, is made up of a sleeve 3 (FIG. 3 and 4) inside of which is inserted arbor shaft 23 (FIG. 1 and 3) supported by bearings 6 (FIG. 1 and 3) and by the group of bearings 6' and 6" (FIG. 1 and 3); induction motor 2 (FIG. 1 and 2) is fastened by four screws 26 (FIG. 1 and 2) cantilevered by flanges 25 (FIG. 1 and 2).

Rotor 5 (FIG. 2 and 9) which translates the electromagnetic energy into mechanical energy is mounted, also cantilevered, on the arbor shaft.

Completing the unit, there are:

(a) dynamic and static sealing device 24 (FIG. 1 and 3) mounted on the front part of arbor shaft 23 (FIG. 1 and 3).

Figure 5:
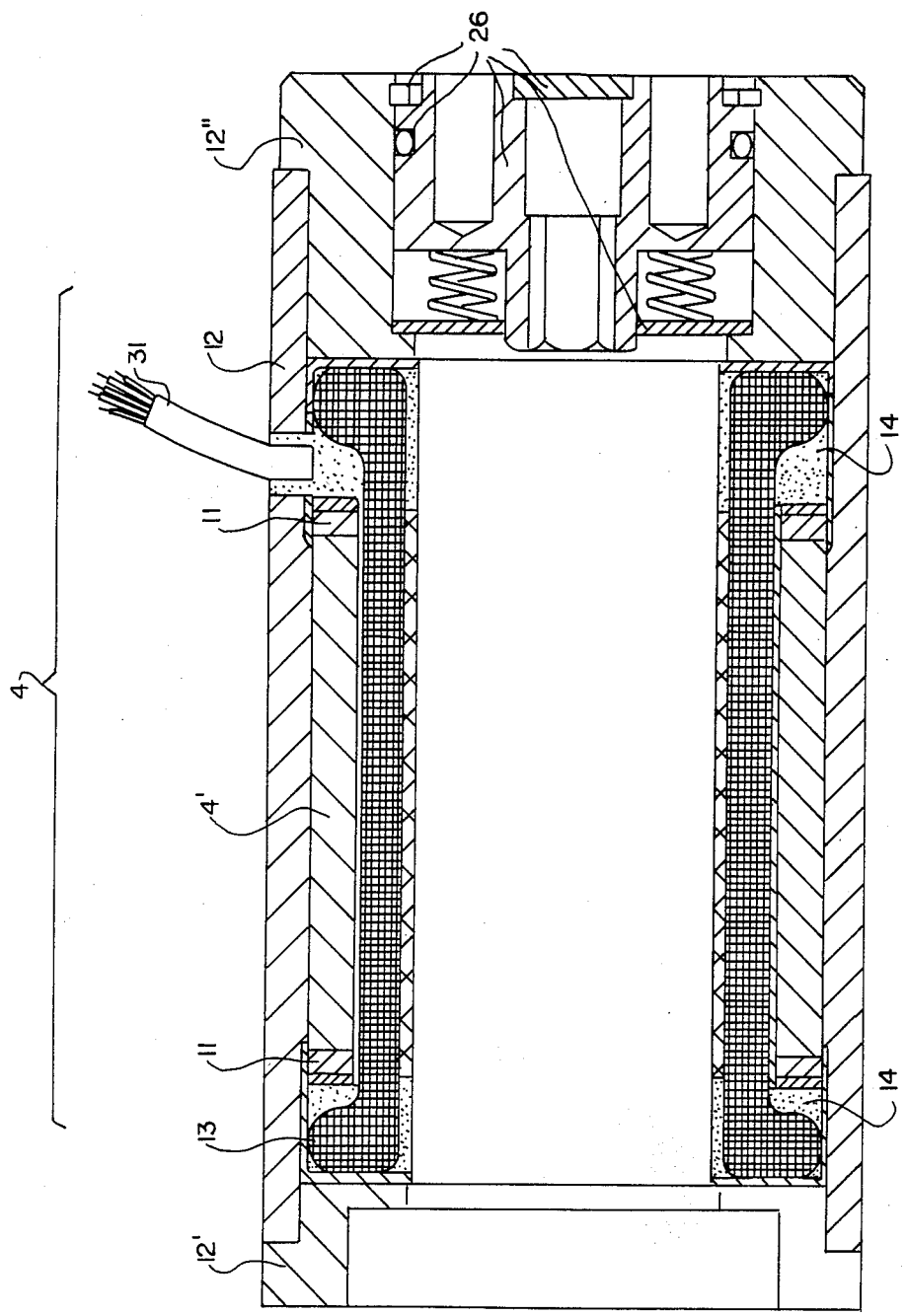
FIG. 5 represents, in axial section, the assembly of all the elements that make up the static part of the induction motor.

(b) clamping device 26 (FIG. 1,2 and 5) of arbor shaft 23 (FIG. 1 and 3) mounted behind and on the inside of motor 2 (FIG. 1, 2 and 5).

(c) electrical connection box 32 (FIG. 1 and 2) fastened laterally to the frame of the motor by two screws 33 (FIG. 1 and 2) which fastens and protects supply cable 31 (FIG. 1 and 5). For said box there is also provided a version with plug and socket for quick coupling and uncoupling.

Sleeve 3 (FIG. 3 and 4) comprises two coaxial tubular parts 3' and 3" (FIG. 3 and 4): they are made from remelted chrome steel, preshaped by forging, successively worked by chip removal, then core thermally treated (including cooling at −70° C) (hardness: 62 HRC). The working of the two parts is initially normal, i.e., each single part is worked independently of the other.

When the first grinding operations are completed, the two parts 3' and 3" are assembled (FIG. 4) and fastened by internally threaded nut 34 (FIG. 4). To allow fastening of part 3" inside 3' (FIG. 4), part 3" is designed with a head on its end and a threaded part on its opposite end, while part 3' is designed with two suitable seats (as shown in FIG. 4). The two parts 3' and 3", assembled as said, undergo the final grinding which exactly characterizes the extreme precision of sleeve 3 since distance 3''' (which for good operation of the arbor does not allow tolerances between the outside shoulders of 3' and the inside shoulders of 3") is achieved while the seats of bearings 36 and 36 (FIG. 4) are ground.

Obviously by proceeding in this way, the shoulders at distance 3''' of outside part 3' will have the identical dimension of the shoulders of inside part 3". Also the two inside seats 35' and 36' (FIG. 4) of part 3" are ground while respective seats 35 and 36 are ground, thus obtaining a very close tolerance of concentricity which does not exceed the value of 0.002 mm.

Part 3" finally will undergo another operation of removal of the head which was used for workings performed together with part 3' (FIG. 4).

The outside diameter of sleeve 3 (FIG. 3 and 4) is finished with a diamond grinding wheel with resin binder to 1 obtain a slight roughness (Ra: 0.08–0.15 μm) and very limited machining tolerances: nominal diameter +0.002/+0.004 mm: roundness within 0.001 mm and cylindricality, over the entire length of the sleeve, within 0.0015 mm.

With these characteristics the sleeve can be mounted in a bushing with ball bearing cage allowing the dynamic rectilinear movement of the electric arbor with great precision and rigidity.

Considering the precision obtained &n sleeve 3, according to the invention, mounting is possible of bearings 6, 6' and 6" (FIG. 1 and 3) of very great precision, matched at the manufacturer's to have absolute guarantee of desired prestress values without having to perform any measurement or adjustment. The particular method of making sleeve 3 and the materials selected for the two components 3' and 3" guarantee the perfect functioning even with temperature variations; actually the possible expansion difference, for the two parts in question 3' and 3" (FIG. 4) is so small as to be practically insignificant and in any case would be translated into a load variation far less than the load variations that arbor 1 (FIGS. 1 and 2) must support because of the work that it must perform.

Arbor shaft 23 (FIG. 1 and 3), made of case-hardened, tempered steel (hardness 60 HRC), is provided in various shapes of the front end part ("nose"):

for clamping of tool 30 (FIG. 1) by means of a chuck 29 and relative nut 28 (FIG. 1);

for holding of conical tools clamped by means of a nut;

for holding conical tools with fast coupling and uncoupling;

for tools or tool-holders with flange clamp.

The version of the arbor shaft is also provided with a central bore for bringing in of cooling liquid and/or lubrication of the tool, since in many cases, given the high speed of rotation, the cooling liquid and/or lubrication made to come to the tool by an outside jet actually does not reach the tool because of the vortex produced by the tool itself.

At the front end of arbor shaft 23 /FIG. 1 and 3), for protection of bearings 6' and 6" is a dynamic and static sealing device 24 (FIG. 1 and 3). It is a gasket that does not allow infiltration of liquids and solid particles which otherwise would seriously damage bearing° 6' and 6".

The feature of said device 24 consists in the fact that when the electric arbor is stopped, the gasket, made of a synthetic material resistant to very many chemical agents, presses against a thermally treated, lapsed steel washer; when the unit is in operation said gasket first lightens the pressure against the washer, then, when a certain number of rpms is reached, the gasket is removed completely by centrifugal effect to allow the highest rotation condition without the minimum friction.

Figure 6:
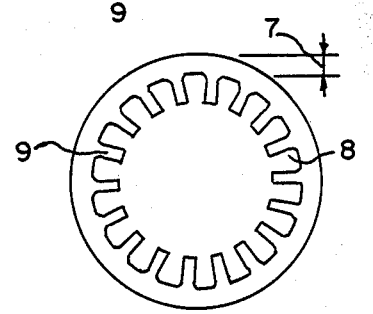
FIG. 6 represents the shape of the laminations that make up the stator core stack of the motor, showing the proportioning of the ring, slots and teeth.

Stator 4 (FIG. 2 and 5) of the electric arbor in question, according to the invention, is made up of magnetic laminations (FIG. 6) of very small thickness, to allow small losses even at high frequencies up to and beyond 3000 Hz, and incorporated with epoxy resin 14 (FIG. 5 and 7) charged with sand particles which improve the thermal conductivity without compromising its electrical insulation which results from very high resistivity. The composition of the material from which the laminations (FIG. 6) are made is such as to allow a high magnetic saturation, so a proportioning has been sought in stator slots 8 (FIG. 6), outside ring 7 (FIG. 6) and teeth 9 (FIG. 6) which would permit maximum use to be made of the quality of the material; for this purpose, materials with the highest resistivity are used for insulations 10 (FIG. 7) of the stator slots to allow a considerable reduction of the thickness of said insulations 10 without compromising the insulation of the stator. In any case in regard to the insulation, resin 14 (FIG. 5 and 7) is decisive, which is inserted hot and accelerates the individual molecules of the resin, which being placed between the coils of winding 13 (FIG. 7) and between the winding 13 itself and frame 12, 12' and 12" (FIG. 5) and winding 13 itself and frame 12, 12' and 12" (FIG. 5) and core stack 4' (FIG. 5) guarantees the final result and gives the stator thus constructed great reliability in time.

This special construction, besides limiting the losses, considerably improves the resistance of the winding, makes it practically insensitive to water, to many radiations, to many chemical agents and notably improved the heat dispersion capacity; consequently most o: the electric arbors made according to the invention can be lubricated with grease and therefore completely closed.

Forced lubrication with an oil mist is provided only for certain applications, and in particular for shafts with larger dimensions and used for very high speeds.

Rotor 5 (FIG. 1 and 9) made with magnetic! laminations (FIG. 10) with low loss and slight thickness, dimensioned for low-resistance conductors makes it possible to use a larger than normal shaft.

The construction is particularly sturdy thanks to rings 17 (FIG. 9), housings 20 (FIG. 9) of stainless steel and with the damping resin that neutralizes the effects of resonance to which conductors 16 (FIG. 9) are subjected allows very high rotation speeds while allowing a good service life of the bearings. This rotor, thus constructed, makes it possible to dimension the diameter of the rotor itself greater than normal, by which a notably higher torque is available even at low rotation conditions.

The main advantages offered by the electric arbor under discussion are:
Simple, sturdy and modular construction;
High torque at any operating conditions;
Extremely reduced vibrations;
Operating silence;
No adjustment of the prestress of the bearings;
Extreme simplicity in use.

The "modular" construction, i.e., with easily interchangeable groups, allows the achievement of units that reasonably meet a large number of specific requirements; also allowing easy updating of the same unit to adapt it to the ever faster developments of the market which the user must face.

The particularly simple, sturdy mechanics, the electromagnetic dimensioning with ample reserves and the use of suitable materials, as provided by this invention, allow the use of this electric arbor on highly productive automatic machines with very high productivity which work with a continuous cycle, i.e., 24 hours a day.

The high mechanical stability, the precision of rotation and the precision of rectilinear movement (advance of work) that an electric arbor made according to the invention can attain allows the use of highly productive tools, for example: of hard metal, ceramics, natural diamonds, synthetic diamonds and boron nitride.

The quite compact dimensions and the possible motorizing characteristics for said electric arbor, according to the invention, in particular the high torque available even at low speeds, joined with the simplicity of substitution of tools and the relatively low cost are factors that allow the use of the electric arbor under discussion even on small all-purpose machines, for example lathes and milling machines, for the operations of:

grinding; internal, external and end;
milling and turning:
drilling;
milling;
turning with rotating tool; internal and external;
burnishing.

Figure 8:
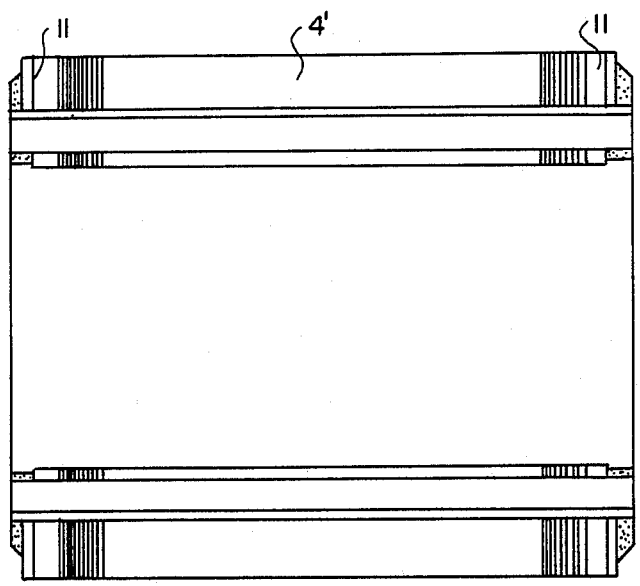
FIG. 8 represents the stator core stack and the end washers.
Figure 7:
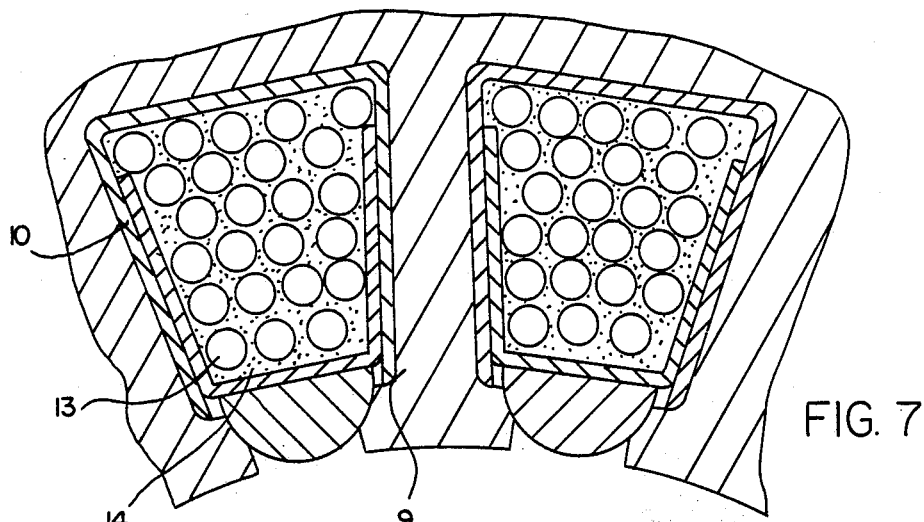
FIG. 7 represents the insulations of the stator slots, the windings, the insulating resin in the slots and the shape of the teeth.
Figure 9:
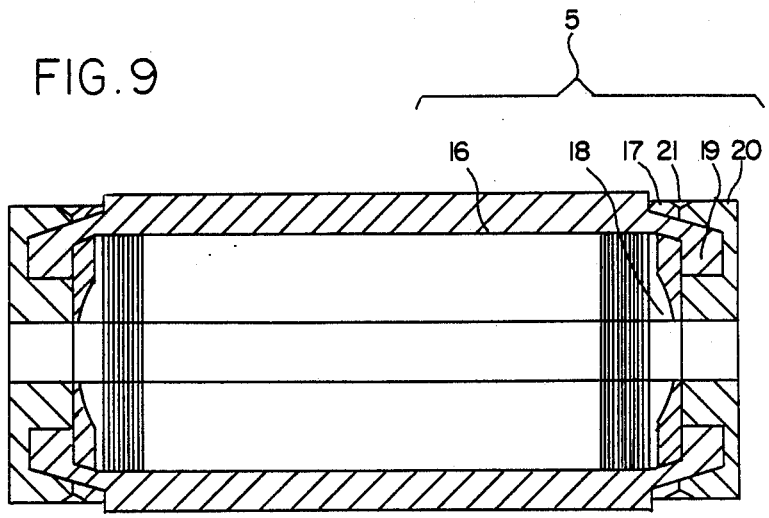
FIG. 9 represents the rotor and its component elements.
Figure 11:
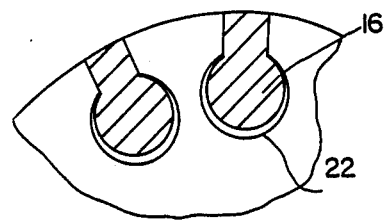
FIG. 11 represents the wires that form the rotor squirrel cage and where the damping resin is inserted.
Figure 10:
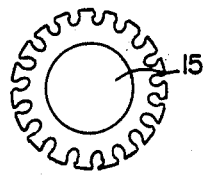
FIG. 10 represents the shape of the laminations that make up the rotor core stack and the proportioning of the relative hole form the shaft.

I claim:
1. A process for manufacturing a stator (4, FIG. 2 or FIG. 5) and a rotor (5, FIG. 2 or FIG. 9) of an electric arbor, comprising by the following steps:
  (a) providing laminations (FIG. 6) with a thickness less than that normally used;
  (b) dimensioning said laminations with the minimum thickness of an outside ring (7, FIG. 6) of the stator;
  (c) dimensioning stator slots (8, FIG. 6) to have the maximum thickness of the tooth (9, FIG. 6 and 7) by providing slot insulation (10, FIG. 7) with insulation having high resistivity and less than normal thickness;
  (d) providing at each end of a stator core stack (4', FIG. 8) a washer (11, FIG 8) of a material having a high thermal conductivity, superficially insulating and equal in shape to that of the laminations (FIG. 6), which transmits the heat from said stator stack (4', FIG. 8) to an outside stator frame (12, FIG. 2 or FIG. 5) of a material having high thermal conductivity that is provided with a cooling system;
(e) introducing in the stator slots (8, FIG. 6) windings (13, FIG. 5 and FIG. 7) of wire of a material with high electrical conductivity and superficially insulated;
(f) inserting in said frame (12, FIG. 2 or FIG. 5) the wound stator (4, FIG. 2), a front flange (12', FIG. 2 or FIG. 5) and a back flange (12", FIG. 2 or FIG. 5);
(g) introducing insulating resin (14, FIG. 5 and FIG. 7) so that it comes to occupy all the interstices of the winding, thereby replacing the air which was present before this operation is performed, said resin being relatively elastic and undergoing an increase in its elasticity with an increase of temperature and being charged with substances that increase the thermal conductivity of the resin so as:

to increase the insulation between the coils of the winding (13, FIG. 5 and FIG. 7) within the stator slots (8, FIG. 6) and in the ends of the stator;

to make the winding (13, FIG. 5 and FIG. 7) hermetically sealed to infiltrations of liquids or minute metal particles;

to define with precision the geometry of the overhangs of the winding (13, FIG. 5 and FIG. 7);

to keep the conductors of the winding (13, FIG. 5 and FIG. 7) from being able to vibrate;

to increase the evacuation of heat from the stator (4, FIG. 2 and FIG. 5) to the outside frame (12, FIG. 2 and FIG. 5); and to increase the resistance of the motor to overloads, even extended overloads without suffering damage;

(h) making the rotor core stack (5, FIG. 2 and FIG. 9) by using thin laminations (FIG. 10), inorganically insulated and having a hole (15, FIG. 10) for a larger than normal shaft, by using for this purpose conductors (16, FIG. 9 and FIG. 11), for a squirrel cage, with very low resistance and melted on the ends to achieve short-circuit rings (19, FIG. 9);

(i) placing on each end of the rotor (5, FIG. 2 and FIG. 9) a washer (17, FIG. 9) of a material having a high mechanical and amagnetic resistance, provided with ducts (18, FIG. 9) to feed in a damping resin (22, FIG. 9) to eliminate the vibrations of the conductors; melting the terminals of the conductors (16, FIG. 9 and FIG. 11) to obtain the respective short-circuit rings and successively to each short-circuit ring applying a housing (20, FIG. 9), also of a material having high mechanical and amagnetic resistance, welded (12, FIG. 9) to said washer (17, FIG. 9), without additional material, to contain the centrifugal effect to which the ring is subjected, given the very notable centrifugal force that is generated at high frequencies.

* * * * *